United States Patent [19]

van der Lely

[11] 4,088,195

[45] May 9, 1978

[54] SOIL CULTIVATING IMPLEMENTS

[76] Inventor: Cornelis van der Lely, 7, Bruschenrain, Zug, Switzerland

[21] Appl. No.: 692,784

[22] Filed: Jun. 4, 1976

[30] Foreign Application Priority Data

Jun. 10, 1975 Netherlands ............... 7506857

[51] Int. Cl.$^2$ ............................................ A01B 33/06
[52] U.S. Cl. ........................................ 172/59; 172/68; 172/70; 172/80
[58] Field of Search ............. 172/49, 59, 77, 76, 172/79, 96, 526, 523, 522, 80, 387, 394, 68, 70

[56] References Cited

U.S. PATENT DOCUMENTS

| 527,875 | 10/1894 | Nishwitz | 172/387 |
| 647,828 | 4/1900 | Gunning | 172/387 |
| 659,864 | 10/1900 | White | 172/387 |
| 1,059,688 | 4/1913 | Curen | 172/59 |
| 2,496,423 | 2/1950 | Taylor | 172/96 |
| 3,616,862 | 11/1971 | Lely | 172/59 |
| 3,951,213 | 4/1976 | Lely | 172/59 |

FOREIGN PATENT DOCUMENTS 7,205,221 4/1972 Netherlands ............... 172/59

*Primary Examiner*—Richard J. Johnson
*Attorney, Agent, or Firm*—Mason, Mason & Albright

[57] ABSTRACT

A cultivator has a row of soil working members journalled in an elongated frame portion. The frame portion is supported on side-by-side elongated elements that extend generally parallel to the direction of travel. The elements are preferably curved and can be arranged in a forward group attached at the front of frame portion and a rear group of different-shaped elements that are interconnected to the frame portion to bear on the ground at the rear of the soil working members. The rear group can be fastened to a central carrier and curved to form a supporting roller. The elements can be inherently resilient and/or interconnected with spring mechanisms so that the soil working members respond to ground undulations.

13 Claims, 13 Drawing Figures

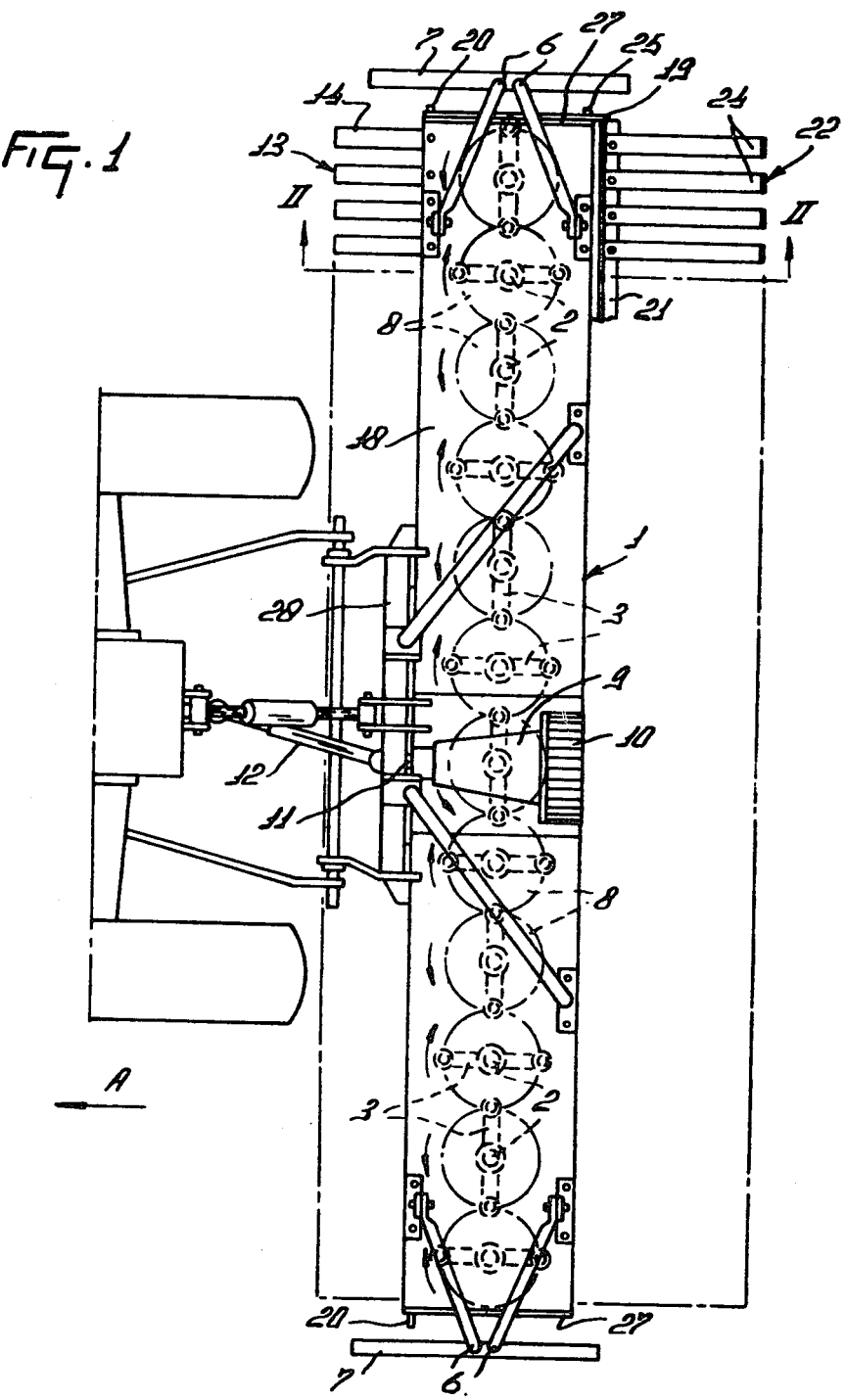

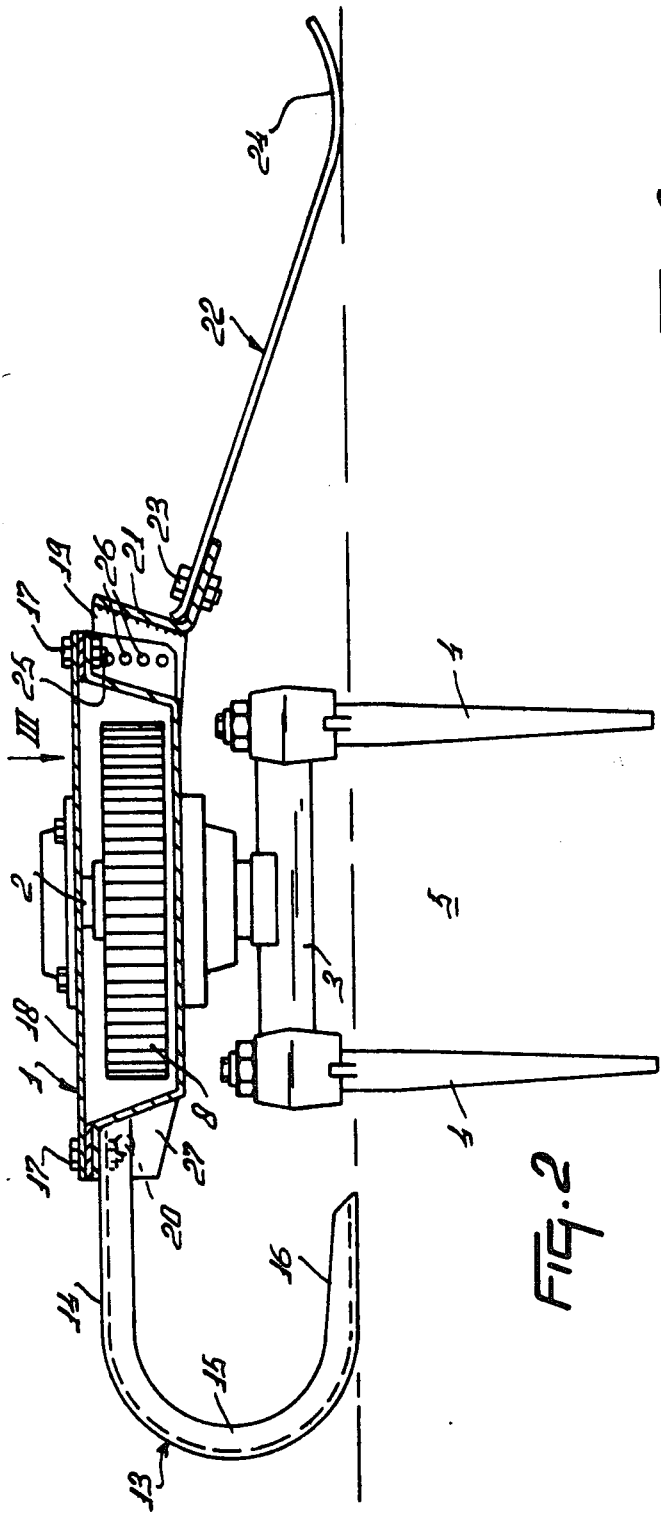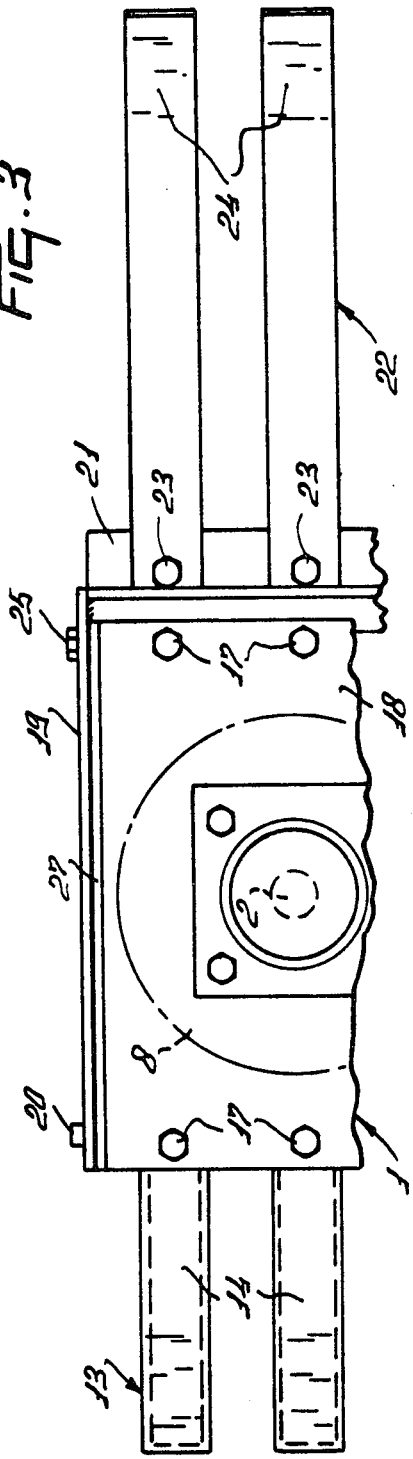

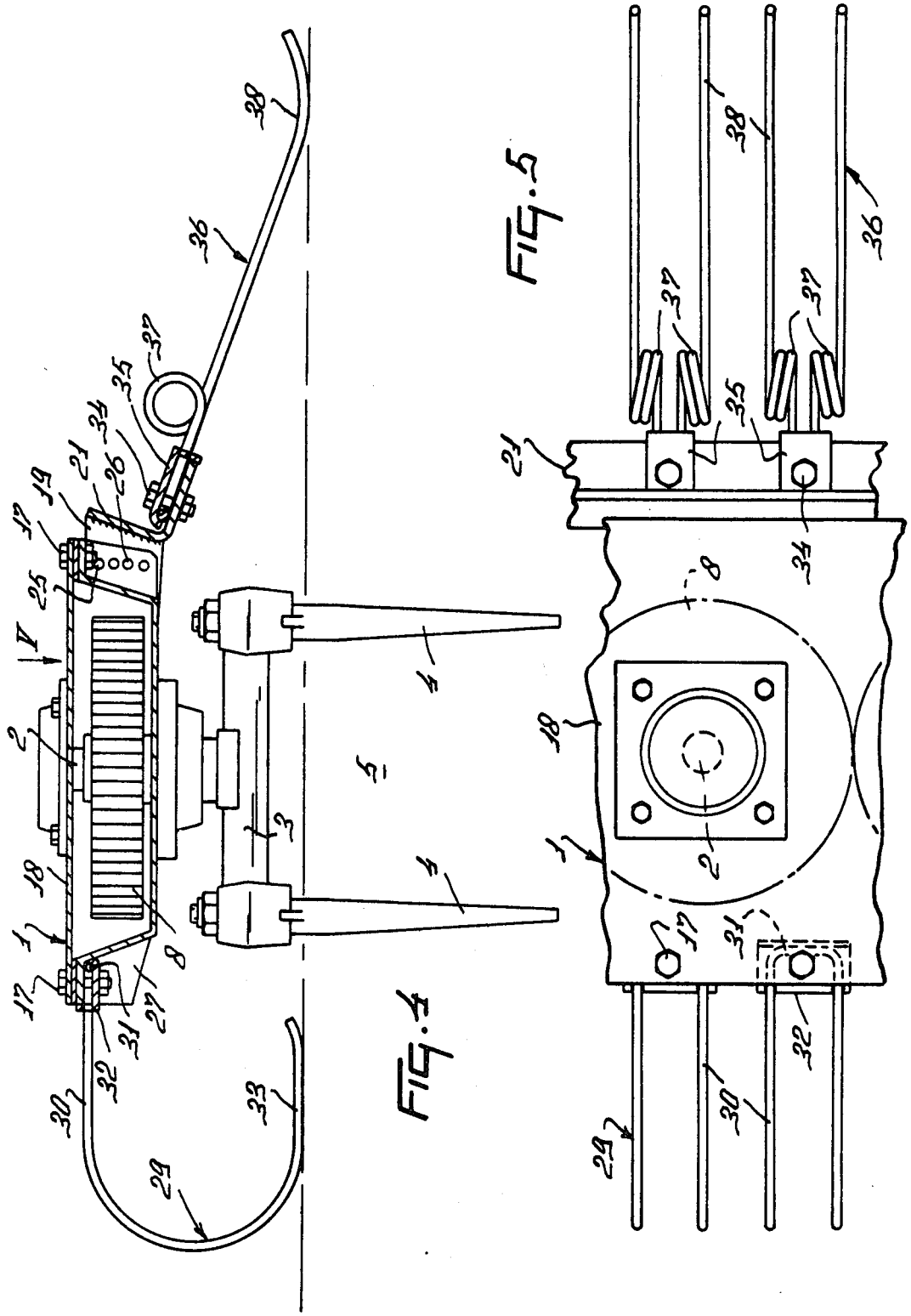

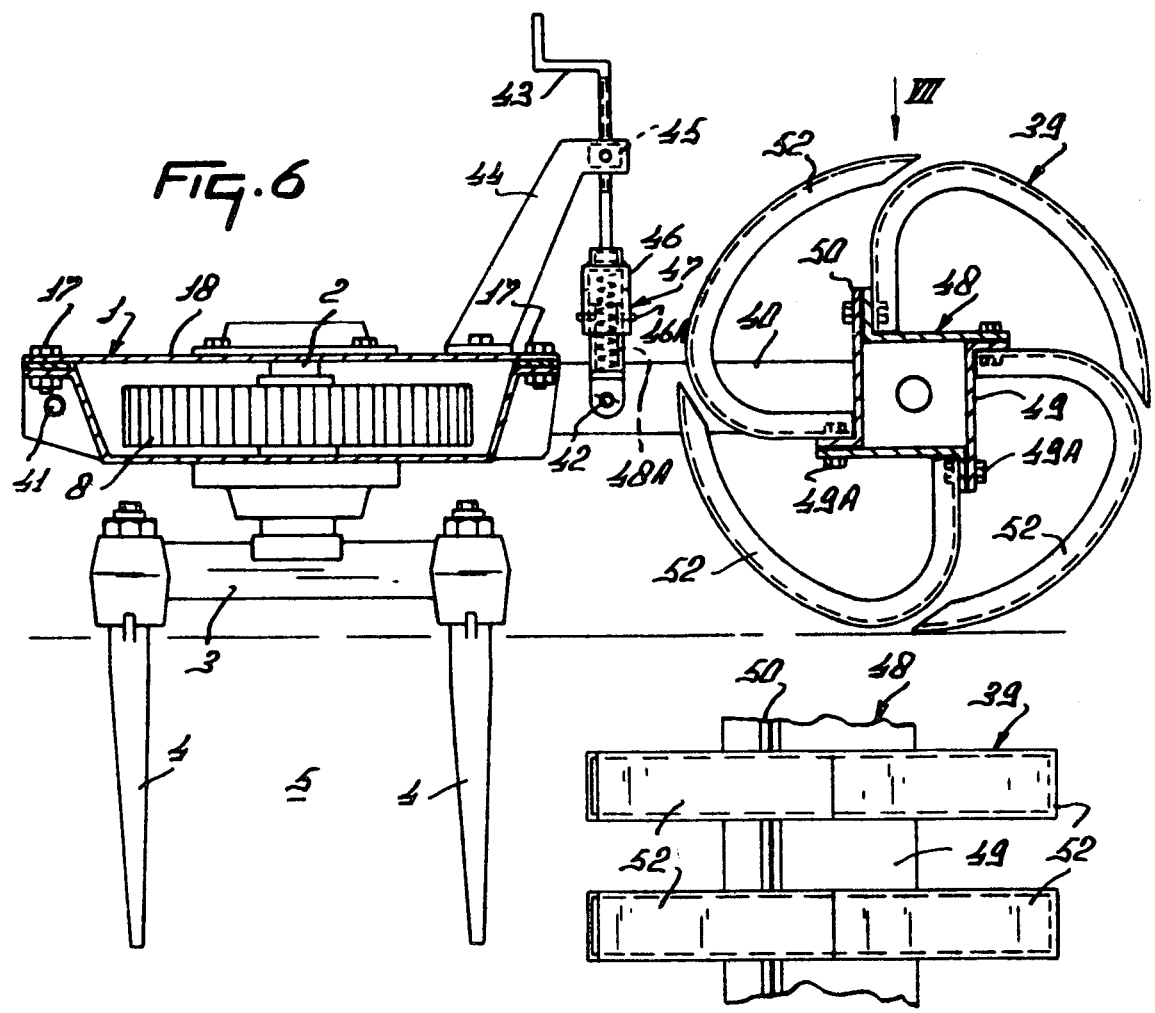
FIG. 6
FIG. 7
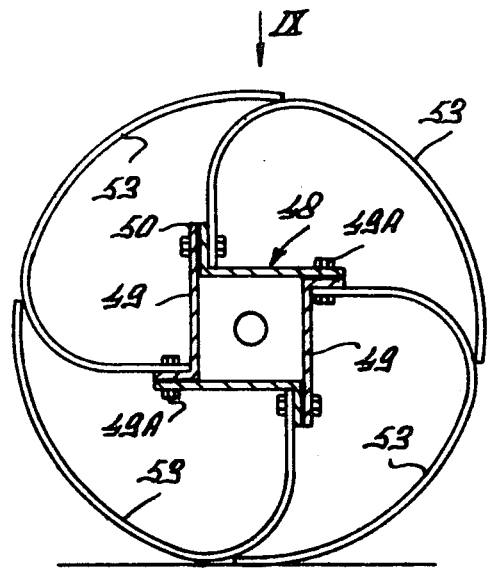
FIG. 8
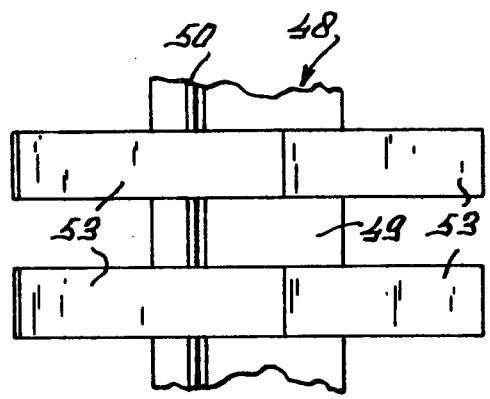
FIG. 9

SOIL CULTIVATING IMPLEMENTS

According to one aspect of the invention, there is provided a soil cultivating implement of the kind set forth, wherein a plurality of elongated supporting elements are provided to support the frame portion from the ground during operation of the implement, each elongated supporting element extending in non-parallel relationship with the length of said row of soil working or cultivating members and said elements being arranged to give support to the frame portion both in front of and behind the row relative to said direction.

Figure 10:
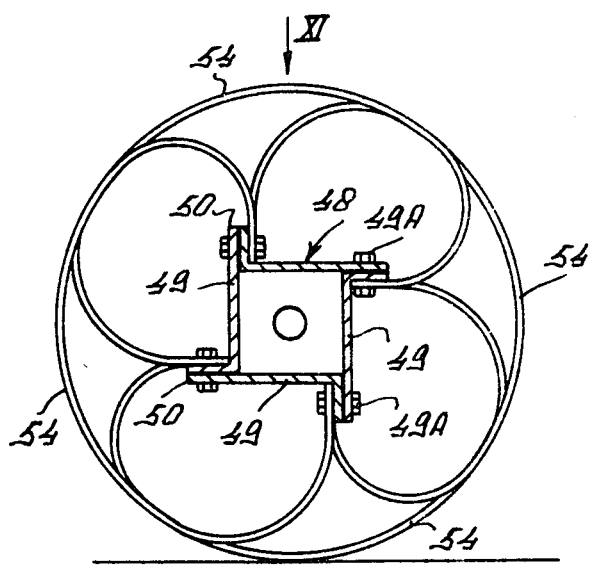
Figure 11:
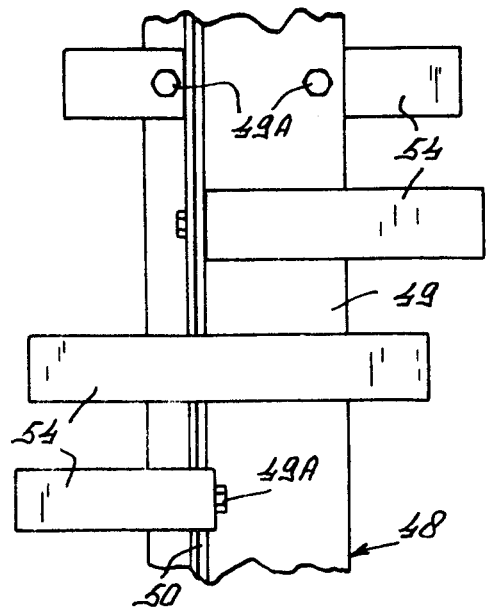
Figure 12:
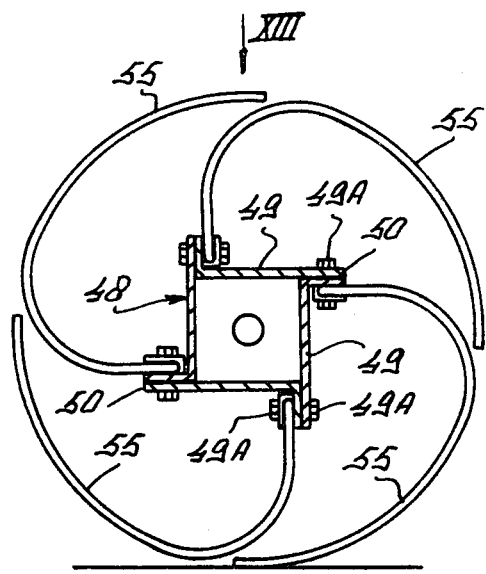
Figure 13:
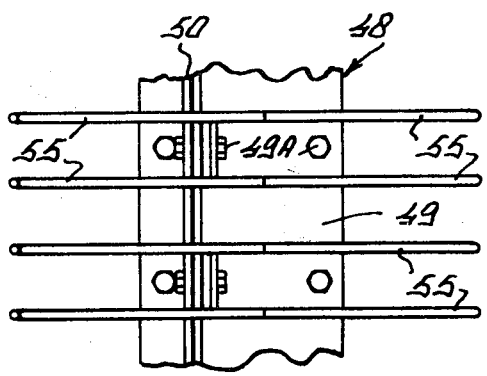

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a plan view as seen in the direction indicated by an arrow III in FIG. 2, FIG. 4 is a section, to an enlarged scale, taken on the line II—II in FIG. 1 but illustrates an alternative embodiment to that of FIGS. 1 to 3, FIG. 5 is a plan view as seen in the direction indicated by an arrow V in FIG. 4, FIG. 6 is a further section, to an enlarged scale, taken on the line II—II in FIG. 1 but illustrates a further alternative embodiment, FIG. 7 is a plan view as seen in the direction indicated by an arrow VII in FIG. 6, FIGS. 8, 10 and 12 all substantially correspond to the right-hand side of FIG. 6 of the drawings but illustrate three further alternative supporting member constructions, and FIGS. 9, 11 and 13 are plan views as seen in the directions indicated by arrows IX, XI and XIII in FIGS. 8, 10 and 12 respectively.

Referring to FIGS. 1 to 3 of the accompanying drawings, the soil cultivating implement that is illustrated therein is in the form of a rotary harrow which has a hollow box-shaped frame portion 1 that extends substantially horizontally transverse, and usually substantially horizontally perpendicular, to the intended direction of operative travel of the implement that is indicated in FIG. 1 by an arrow A. A plurality (in this case twelve) of substantially vertical, or at least upwardly extending, shafts 2 are rotatably mounted in the hollow frame portion 1 in a single row that extends parallel to the maximum dimension of said frame portion, the axes of rotation of the shafts 2 being spaced apart from one another at regular intervals which preferably, but not essentially, have magnitudes of substantially 25 centimeters. The lower ends of each of the twelve shafts 2 project from beneath the bottom of the hollow frame portion 1 at which location each of them is rigidly secured to the center of a corresponding substantially horizontally disposed tine support 3. The opposite ends of each tine support 3 are provided with sleeve-like tine holders whose axes are substantially parallel to those of the corresponding shaft 2, said holders receiving fastening portions of rigid tines 4 that extend downwardly from said holders towards the ground surface so as to penetrate into that surface when the implement is in use. Each tine support 3, the corresponding holders and the corresponding tines 4 together afford a rotary soil working or cultivating member that is generally indicated by the reference 5, there thus being twelve of the members 5 arranged, like the shafts 2, in a single row that is substantially horizontally transverse, and usu-ally substantially horizontally perpendicular, to the direction A.

Two shield plates 7 are arranged just beyond the opposite ends of the row of soil working or cultivating members 5, said shield plates 7 being in substantially parallel relationship with one another and with the direction A and having lowermost edges that are arranged to move slidably in the direction A over the ground surface. Each shield plate 7 is connected by a corresponding pair of arms 6 to horizontally aligned pivots that are mounted on top of the hollow frame portion 1 close to the end of that frame portion near which the shield plate 7 concerned is disposed. The axis that is defined by each pair of pivots extends substantially horizontally parallel to the direction A so that, during the use of the implement, the shield plates 7 can turn upwardly and downwardly about those axes to match undulations in the surface of the soil that may be met with during progress in the direction A. The shield plates 7 act to minimise ridging of the soil at the opposite edges of the broad strip thereof which is worked by the members 5 and also greatly reduce the number of stones and the like that are flung laterally of the path of travel of the implement by its rapidly moving tines 4. Each of the shafts 2 is provided, inside the hollow frame portion 1, with a corresponding straight-toothed or spur-toothed pinion 8, said pinions 8 being dimensioned and arranged in such a way that the teeth of each pinion 8 are in mesh with those of its neighbour, or those of both of its neighbours, in the single row of twelve such pinions. With this arrangement, the pinions 8, shafts 2 and soil working or cultivating members 5 rotate, during the operation of the implement, in the directions that are indicated by small arrows in FIG. 1 of the drawings, each member 5 thus revolving in a direction that is opposite to that of its immediate neighbour or to those of both of its immediate neighbours. One of the center pair of 12 shafts 2 has an upward extension through the top of the hollow frame portion 1 into a gear box 9 that is mounted on top of said frame portion. The shaft extension is placed in driven connection, by way of meshing bevel pinions located inside the gear box 9, with a substantially horizontal shaft (not visible) that extends substantially parallel to the direction A. The rearmost end of this substantially horizontal shaft, and the rearmost end of an overlying and parallel shaft 11 both projects through the back of the gear box 9 into a change-speed gear 10 that is carried at the rear of the gear box 9. These ends of the two shafts are splined or otherwise keyed to receive the correspondingly splined or keyed hubs of an intermeshing pair of straight-toothed or spur-toothed pinions that are not visible in the drawings. Preferably, at least two pairs of such pinions of different sizes are provided and the transmission ratio between the shaft 11 and the underlying and parallel shaft depends upon the pair of pinions employed in the change-speed gear 10 and its arrangement on the splined or otherwise keyed ends of the two shafts. Thus, the speed of rotation of all of the members 5 can be changed without having to alter the speed of rotation that is applied to the shaft 11 whose leading end projects forwardly from the front of the gear box 9 with respect to the direction A where it is splined or otherwise keyed to enable it to be placed in driven connection with the power take-off shaft of an agricultural tractor or other operating vehicle by way of an intermediate telescopic transmission shaft 12, that is of a construction which is known per se, having universal joints at its opposite ends.

The front of the hollow frame portion 1 with respect to the direction A is provided with a large number of elongated supporting elements 13 that are spaced apart from one another along the front of the frame portion 1 at regular distances. Each element 13 is in the form of a substantially U-shaped bracket but with the limbs of the U substantially horizontally disposed. As can be seen best in FIG. 2 of the drawings, an upper limb 14 of each element 13 extends substantially horizontally forwards from the point at which it is secured to the hollow frame portion 1, its leading end merging into a 180° curved web or base 15 of the corresponding bracket and the lower rearwardly directed end of said base 15, in turn, merging into a horizontal limb 16 of the element 13 that extends rearwardly from said base 15 in parallel relationship with the upper limb 14. As seen in plan view (FIGS. 1 and 3), the upper limbs 14 are in substantially exact vertical register with the lower limb 16, the curved bases 15 of the elements 13 that interconnect said limbs 14 and 16 being of uniform semicircular curvature. The rear end of each upper limb 14 is secured to the hollow frame portion 1 by one of a plurality of substantially vertically disposed bolts 17 which bolts 17 also fasten a substantially flat upper wall or cover plate 18 of the hollow frame portion 1 to the underlying remainder of that frame portion.

It can be seen from FIGS. 2 and 3 of the drawings that, in plan view, the free rearwardly directed ends of the lower limbs 16 of the elements 13 are located immediately in advance, with respect to the direction A, of the top and front of the hollow frame portion 1. The rear of said hollow frame portion 1, with respect to the direction A, has a bar 21 of L-shaped cross-section arranged close to it, said bar 21 being upwardly and downwardly adjustable in position relative to the frame portion 1 by having its opposite ends rigidly secured to the rearmost ends of two arms 19 that are turnable upwardly and downwardly alongside opposite substantially vertical end plates 27 of the frame portion 1 about substantially horizontally aligned stub shafts 20, or equivalent pivot bolts, that are secured to said end plates 27 near to the fronts of those two end plates. Rearmost portions of the two end plates 27 are both formed with curved rows of holes 26 which are equidistant from the axis defined by the stub shafts 20 or equivalent pivot bolts. Each arm 19 is formed at the same distance from said axis with a single hole and horizontally disposed bolts 25 can be entered through the holes in the arms 19 and chosen aligned holes 26 to maintain said arms 19 in a corresponding angular position about the axis defined by the stub shafts 20 or equivalent pivot bolts. The position of the bar 21 relative to the hollow frame portion 1 is thus determined. The bar 21 is secured to the two arms 19 in such a way that one of its two limbs is inclined upwardly and rearwardly with respect to the direction A from the junction between those two limbs while the other limb is inclined downwardly and rearwardly from said junction with respect to the direction A. The latter limb has a plurality of elongated supporting elements 22 secured to it at regualr intervals along its length by corresponding bolts 23. Each supporting element 22 is formed from resilient strip-shaped material such, for example, as spring steel. Each element 22 extends rectilinearly away from the limb of the bar 21 to which it is secured by the corresponding bolt 23 in a direction that is substantially parallel to the general plane of that limb but, near its rearmost free end, it exhibits an arcuately curved portion 24 whose convex surface faces downwardly towards the ground. Each element 22 is thus bent over upwardly near its rearmost end, its rearmost extremity being directed upwardly and rearwardly with respect to the direction A away from the ground surface. As can be seen best in FIG. 2 of the drawings, the curved portions 24 of the strips 22 bear against the ground surface during the use of the implement by way of their downwardly directed convex surfaces.

It is preferred that the number of elongated supporting elements 13 at the front of the implement should be equal to the number of elongated supporting elements 22 at the rear thereof and, with this preferred arrangement, each element 13, as seen in plan view (FIGS. 1 an 3) is in register in the direction A with a corresponding one of the supporting elements 22 at the rear of the frame portion 1. The material from which each element 13 is made is of shallow U-shaped or channel-shaped cross-section and has the same width as that of the strip-shaped material from which the elements 22 are made. It is preferred that the regular spacing between the elements 13, and the regular spacing between the elements 22, should be substantially the same as the width of one of said elements but should not be less than the width. The supporting elements 22 that are located behind the hollow frame portion 1 with respect to the direction A constitute means by which the implement is resiliently supported from the ground surface during its operative progress in the direction A. The front of the hollow frame portion 1 is provided, substantially midway between the planes of its end plates 27, with a coupling member or trestle 28 that is of generally triangular configuration. Upper regions of the coupling member or trestle 28 are connected by rearwardly and downwardly divergent tie beams to locations at the top and back of the hollow frame portion 1. The coupling member or trestle 28 is constructed and arranged to enable the implement to be connected to the three-point lifting device or hitch at the rear of an agricultural tractor or other operating vehicle in a manner which is generally known per se and which is illustrated in outline in FIG. 1 of the drawings.

During the operation of the implement of FIGS. 1 to 3 of the drawings, its coupling member or trestle 28 is connected to the three point lifting device or hitch at the rear of an agricultural tractor or other operating vehicle and the rotary input shaft 11 of its gear box 9 is placed in driven connection with the power take-off shaft of the same tractor or other vehicle by way of the known telescopic transmission shaft 12 which has universal joints at its opposite ends. Adjustments which may be made before the implement commences work include setting the change-speed gear 10 to govern the speed of rotation of the members 5 having regard to the nature and condition of the soil that is to be cultivated and to the result that is required after treatment and raising or lowering the arms 19 about the axis defined by the stub shafts 20 or equivalent pivot bolts relative to the frame portion 1. It will be appreciated from FIG. 2 of the drawings that the angular dispositions of the arms 19 that are adapted to turn about said axis tend to govern the level of the frame portion 1 relative to ground level and thus the depth to which the tines 4 of the members 5 can penetrate into the soil during the operation of the machine. As the machine moves operatively over a field in the direction A, its soil working or cultivating members 5 will be rotated in the directions that are indicated by small arrows in FIG. 1 of the drawings, the working width of each member 5 having a magnitude of substantially 30 centimeters so that, with the preferred spacing of substantially 25 centimeters between the axes of rotation of neighbouring shafts 2, the strips of land that are worked by the individual members 5 will overlap one another to produce a single broad strip of worked soil. The implement is supported from the ground surface both in front of, and behind the members 5 by the corresponding elongated elements 13 and 22, the particular setting of the arms 19 relative to the frame portion 1 that has been adopted dictating, to a large extent, the depth to which the tines 4 can penetrate downwardly into the soil. The curved bases 15 of the elements 13 have some levelling effect upon the soil that is to be cultivated immediately before it is engaged by the members 5 and the lower limbs 16 of said elements 13 tend to press any loose stones and the like on the ground surface downwardly into the soil so that they will not strike the tine holders nor the fastening portions of the tines 4 that are secured, by nuts, in those holders. This minimises the damage which such impacts with stones would otherwise cause over a period of time to the upper parts of the members 5. Since the elements 22 resiliently support the implement from the ground surface, the implement can readily and smoothly match any undulations in the surface of the soil over which it passes during operative progress in the direction A, so that the implement operates with very little, if any, jolting and rocking. This smooth progress in the direction A facilitates the crumbling effect of the tines 4 upon the soil. The construction that has been described, in which a relatively large number of front supporting elements 13 and rear supporting elements 22 are employed, is particularly suitable for use on wet and heavy soil.

FIGS. 4 and 5 of the drawings illustrate an embodiment in which alternative front supporting elements 29 and rear supporting elements 36 are employed, the soil cultivating implement otherwise being identical to the one that has already been described with reference to FIGS. 1 to 3 of the drawings. The front supporting elements 29 are very similar in shape to the previously described front supporting elements 13 but they are formed from resilient material, such as spring steel, of circular or substantially circular cross-section. Moreover, the elongated elements 29 are formed in integral pairs. To this end, two upper limbs 30 of two immediately neighbouring elements 29 are integrally connected by a tie member in the form of a relatively perpendicular base 31, said base 31 being secured by one of the bolts 17 to the top and front of the hollow frame portion 1 with the aid of a clamping plate 32. Each element 29 has a lower limb 33 that extends substantially horizontally parallel to the direction A but whose rearmost extremity is upwardly and rearwardly inclined at a few degrees to the horizontal (see FIG. 4).

The rear supporting elements 36 are also formed from resilient material, such as spring steel, of circular or substantially circular cross-section and, like the front elements 29, are produced in integral pairs. The junction between the two elongated elements 36 of each pair is secured to the downwardly and rearwardly inclined limb of the bar 21 by a bolt 34 and a co-operating clamping plate 35. Each element 36 includes a rearmost and lowermost curved portion 38 whose downwardly directed convex surface bears against the ground, during the operation of the implement, in the same way as has already been described for the corresponding portions 24 in the embodiment of FIGS. 1 to 3 of the drawings and it will be seen from FIGS. 4 and 5 of those drawings that the resiliency of the connection between each portion 38 and the bar 21 is enhanced by the provision of each element, near to the bar 21, with a corresponding integral helical coil 37 that comprises two substantially complete 360° turns and whose longitudinal axis is transverse to the direction A. As in the embodiment of FIGS. 1 to 3 of the drawings, the downward and rearward inclination of the rear supporting elements 36 from the frame portion 1 can be adjusted, as may be required, by altering the angular positions of the arms 19 relative to the end plates 27. The implement is resiliently sustained from the ground surface at both the front and the rear, with respect to the direction A, by the elements 29 and 36 and the implement is therefore resiliently supported from the ground surface in a particularly effective manner. Once again, the large number of elongated elements 29 and 36 that is provided makes the implement especially suitable for operation on soft soil.

FIGS. 6 and 7 of the drawings illustrate an implement which is similar in many respects to the implement that has already been described above but whose hollow frame portion 1 is supported at only the rear, with respect to the direction A, by a rotatable supporting member 39. In this embodiment, the end plates 27 of the hollow frame portion 1 support substantially horizontally aligned stub shafts or other pivots 41 at their fronts about which stub shafts, or other pivots, arms 40 are turnable upwardly and downwardly alongside the corresponding end plates. The arms 40 project rearwardly beyond the end plates 27 of the hollow frame portion 1 to carry the member 39 in substantially horizontally aligned bearings at their rear ends and each of them is provided, near its midpoint, with a substantially horizontal pivot pin 42 about which a bracket at the lower end of a corresponding screw-threaded cranked spindle 43 is turnable. As can be seen in FIG. 6 of the drawings, supports 44 project upwardly and rearwardly from the top and rear of the hollow frame portion 1 and pivotably carry blocks 45, that are formed with internally screwthreaded bores, by way of trunnion pins. The screwthreaded bores through the blocks 45 at the upper and rearmost ends of the supports 44 co-operate with matchingly screwthreaded portions of the shanks of the spindles 43. The shank of each spindle 43 is provided, at its lower end, with a plain member that is of larger diameter than the remainder of the shank and that is freely rotatably in the upper end of a housing 46 of a corresponding spring mechanism 47. Each housing 46 comprises the upper portion which co-operates in the freely rotatable manner that has just been described above with the corresponding spindle 43 and a telescopically co-operating lower portion whose lower end is turnably coupled to the corresponding arm 40 by one of the pivot pins 42. A helical compression spring 48A of each mechanism 47 is arranged internally of the two portions of each housing 46 so as to tend to part those portions axially and thus urge the corresponding arm 40 downwardly towards the ground surface. The two portions of each housing 46 are, however, prevented from being parted by the corresponding spring 48A by the provision of axially aligned transverse pins 46A on one portion which pins co-operate with slots formed in the other portion.

The supporting member 39 comprises a central carrier 48 of hollow construction which is formed from four co-operating plates 49 that are of identical L-shaped cross-section with one limb of the L considerably longer, in cross-section, than the other. Small bolts 49A are employed in the manner illustrated in FIG. 6 of the drawings to secure the smaller limbs of the plates 49 to free edge regions of the larger limbs of the successive plates 49. The central carrier 48 is thus formed with four ribs 50 that extend parallel to one another and to the intended axis of rotation of the member 39, each rib 50 being afforded by the smaller limb of one of the plates 49 and the co-operating edge region of the larger limb of one of the adjoining plates 49. The bolts 49A also secure elongated elements 52 of shallow U-shaped or channel-shaped cross-section to the ribs 50. The elements 52 are arranged in groups of four, one element 52 of each such group being bolted to a corresponding one of the four ribs 50 and the center lines of all four elements 52 of one such group being contained in a single plane that is substantially perpendicular to the intended axis of rotation of the member 39. The successive groups of four elements 52 are spaced apart from one another at regular intervals lengthwise along the central carrier 48 of the member 39. Each element 52 has a substantially straight portion of which one end is bolted to the corresponding rib 50, the longitudinal axis of said portion being disposed substantially tangentially with respect to a circle centered upon the intended axis of rotation of the member 39. The outer end of the straight portion of each element 52 merges integrally by way of a steeply curved portion into a final less steeply curved portion whose center of curvature is coincident, or substantially coincident, with the axis of rotation of the member 39. It can be seen in FIG. 6 of the drawings that the free ends of the final less steeply curved portions of the elements 52 are located in very close proximity to, but space relationship with, the steeply curved portions of the next elements 52 of the same group considered in a clockwise direction as viewed in FIG. 6.

FIGS. 8 and 9 of the drawings illustrate a rotatable supporting member that is similar to the rotatable supporting member 39 except that it comprises groups of four spring steel or other resilient strip-shaped elements 53 in place of the basically non-resilient elements 52.

FIGS. 10 and 11 of the drawings illustrate the provision of the supporting member 39 with spring steel or other resilient strip-shaped elongated elements 54 that each have their two opposite ends fastened to the central carrier 48. In fact, each element 54 has one of its ends secured by one of the bolts 49A to one rib 50 of the central carrier 48 and its opposite end secured by a further one of the bolts 49A to that rib 50 of said carrier 48 which is diametrically opposed to the rib which co-operates with the first end of the element. Moreover, as will be evident from FIG. 11, successive elements 54 along the axial length of the central carrier 48 are staggered at 90° intervals around the longitudinal axis (axis of rotation) of that carrier.

FIGS. 12 and 13 of the drawings illustrate the provision of the central carrier 48 of the rotatable supporting member 39 with groups of four elongated elements 55 in which each element 55 is formed from spring steel or other resilient material of circular or substantially circular cross-section, the shape of each element 55 as seen in FIG. 12 of the drawings being substantially the same as the shapes of the corresponding elements 52 and 53 as seen in FIGS. 6 and 8 of the drawings. The elements 55 are preferably, as illustrated, formed in integral pairs with the junction between each pair secured to one of the ribs 50 by one of the bolts 49A. With this construction, the two elements 55 of each integral pair are in separate, but immediately neighbouring, groups of those elements 55.

The rotatable supporting member 39 that has been described with reference to any of the embodiments that are illustrated in FIGS. 6 to 13 of the accompanying drawings is such as to allow the frame portion 1 to deflect resiliently relative to the ground surface when required. In the embodiment of FIGS. 6 and 7, the resiliency is provided principally by the spring mechanisms 47 while, in the embodiments of FIGS. 8 to 13, the resiliency is increased because the elements 53, 54 and 55 are themselves of resilient formation. The initial level of the axis of rotation of the member 39 relative to the level of the frame portion 1 can be adjusted upwardly or downwardly by rotating the cranked spindles 43 in appropriate directions and it will be realised that this level is a principal factor in determining the maximum depth of penetration of the tines 4 into the ground surface which is possible during the operation of the implement. The various elements 52, 53, 54 or 55 that are fastened to the central carrier 48 of the member 39 tend to crumble any insufficiently broken up lumps of soil that may be left upon the ground surface by the tines 4 of the foregoing soil working or cultivating members 5, the carrier 48 for the elongated elements being simply constructed from four identical plates 49 and being rotatably connected at its opposite ends to the arms 40 by substantially horizontally aligned bearings. The rotatable supporting member 39 is of open construction so that there is very little tendency for it to become filled with mud and lumps of loose soil when working on wet ground, this desirable feature being particularly noticeable when the resilient elements 53, 54 or 55 are used rather than the basically non-resilient elements 52. Although not illustrated, it is to be noted that the implement of FIG. 6 to 13 of the drawings may, if desired, be provided with a supporting element or elements at its front, as well as at its rear, with respect to the direction A. The front supporting elements 13 and 29 that have been described with reference to FIGS. 1 to 5 of the drawings may advantageously be employed for this purpose.

Although various features of the soil cultivating implements that have been described and/or that are illustrated in the accompanying drawings will be set forth in the following claims as inventive features, it is emphasised that the invention in not necessarily limited to those features and that it includes within its scope each of the parts of each soil cultivating implement that has been described, and/or that is illustrated in any of the accompanying drawings, both individually and in various combinations.

What we claim is:

1. A soil cultivating implement comprising a frame and a plurality of soil working members rotatably mounted on upwardly extending axes, said soil working members being positioned in a row that extends transverse to the direction of travel and said members being journalled in an elongated portion of said frame, a plurality of side-by-side, elongated strip-shaped brackets being connected at the front of said frame portion and along the length thereof, said brackets having upper and lower limbs, the upper limb of each bracket being fastened to said frame portion and extending forwardly to a substantially 180° curved base, the lower limbs bearing on the ground and being positioned adjacent one another, whereby said row of soil working members is protected from debris in and on the ground surface during forward travel.

2. A soil cultivating implement comprising a frame and a plurality of soil working members rotatably mounted on upwardly extending axes, said soil working members being positioned in a row that extends transverse to the direction of travel and said members being journalled in an elongated portion of said frame, a plurality of side-by-side substantially adjacent elements being connected to said frame portion and said elements extending forwardly in front of said row, along substantially the entire length of said frame portion, said elements engaging the ground and protecting said row of soil working members from debris in or on the surface of the ground being worked, said elements being elongated and upper portions thereof extending substantially straight forwardly from the frame portion to forward bends, lower portions of said elements extending rearwardly from said bends to bear on the ground and support at least the front of said frame portion during operation.

3. An implement as claimed in claim 2, wherein said elements are inherently resilient and spaced apart fron one another at regular intervals.

4. An implement as claimed in claim 2, wherein said elements have widths that are substantially equal to the spacing between adjacent elements.

5. An implement as claimed in claim 2, wherein said elements are U-shaped brackets and an upper limb of each bracket is connected to said frame portion and a lower limb bears on the ground.

6. An implement as claimed in claim 5, wherein the limbs of each bracket extend substantially horizontal and forwardly to a forward base that is uniformly curved forwardly in configuration.

7. An implement as claimed in claim 2, wherein further elongated elements are interconnected to said frame portion and to the rear of said soil working members, said further members extending downwardly to contact the ground.

8. An implement as claimed in claim 7, wherein each further element comprises a resilient coil located adjacent a connection between that element and said implement.

9. An implement as claimed in claim 7, wherein a rear end portion of each further element is bent-over upwardly and that element bears on the ground through said rear end portion.

10. An implement as claimed in claim 7, wherein said further elements are resilient rod-shaped elements which are formed in pairs from single lengths of resilient material.

11. A soil cultivation implement comprising a frame and a plurality of soil working members rotatably mounted on upwardly extending axes, said soil working members being positioned in a row that extends transverse to the direction of travel and said members being journalled in an elongated portion of said frame, a plurality of side-by-side substantially adjacent elements being connected to said frame portion and said elements extending forwardly in front of said row along substantially the entire length of said frame portion, said elements engaging the ground and positioned to protect said soil working members from debris in or on the surface of the ground being worked, said elements being generally U-shaped brackets having an upper limb connected to said frame portion and a lower limb bearing on the ground to support at least the front of said frame, said limbs being elongated and extending substantially horizontal to a forward base between the limbs that is substantially uniformly curved in configuration.

12. An implement as claimed in claim 11, wherein said further elements are vertically adjustable, in common, relative to said frame portion.

13. An implement as claimed in claim 11, wherein said elements are strip-shaped and inherently resilient.

* * * * *